Figures 1, 2, 3, 7:
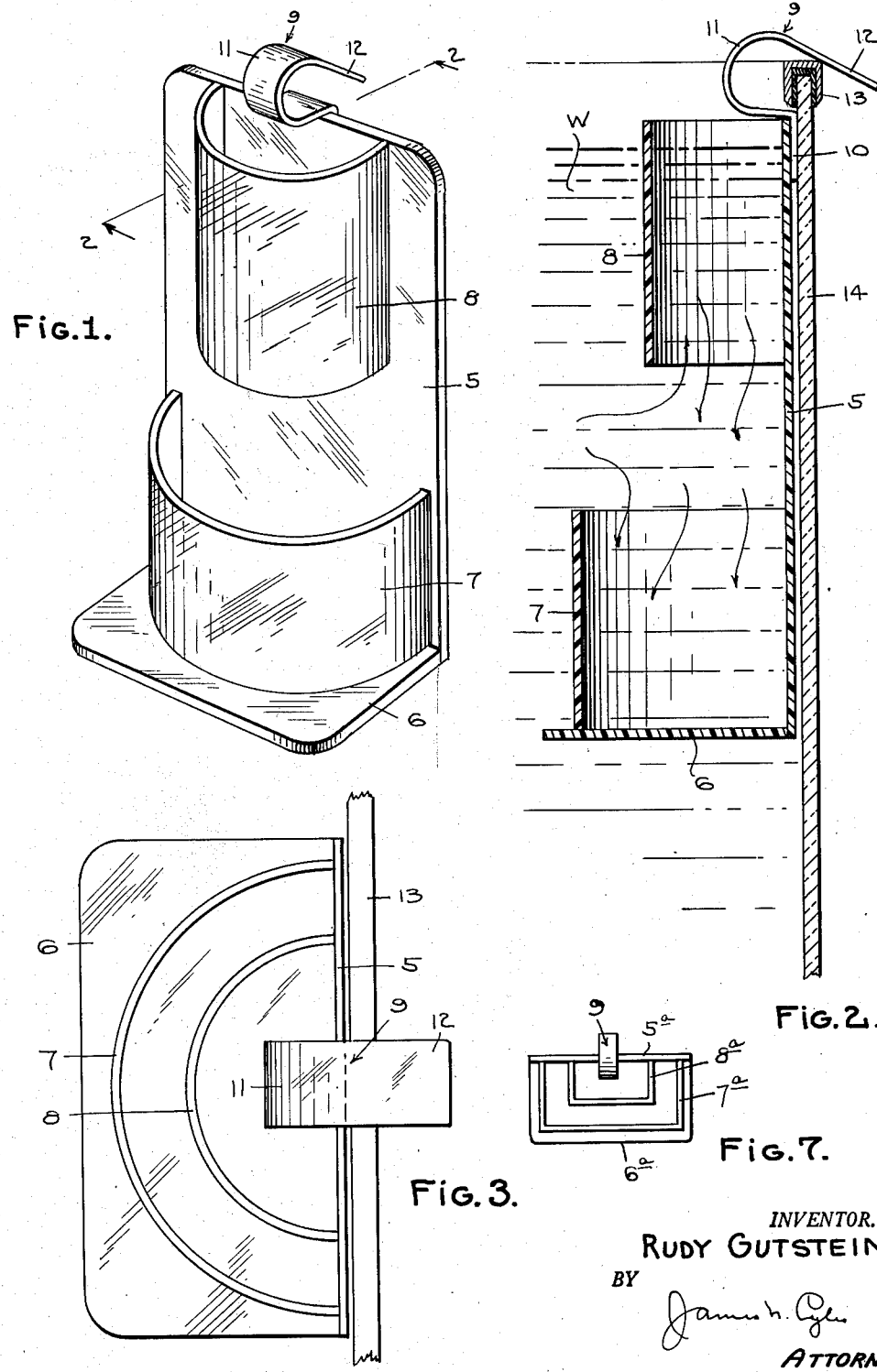

Jan. 17, 1961 R. GUTSTEIN 2,968,280
FISH FEEDING DEVICE FOR AQUARIUMS
Filed Sept. 29, 1959 2 Sheets-Sheet 1

INVENTOR.
RUDY GUTSTEIN,
BY
ATTORNEY

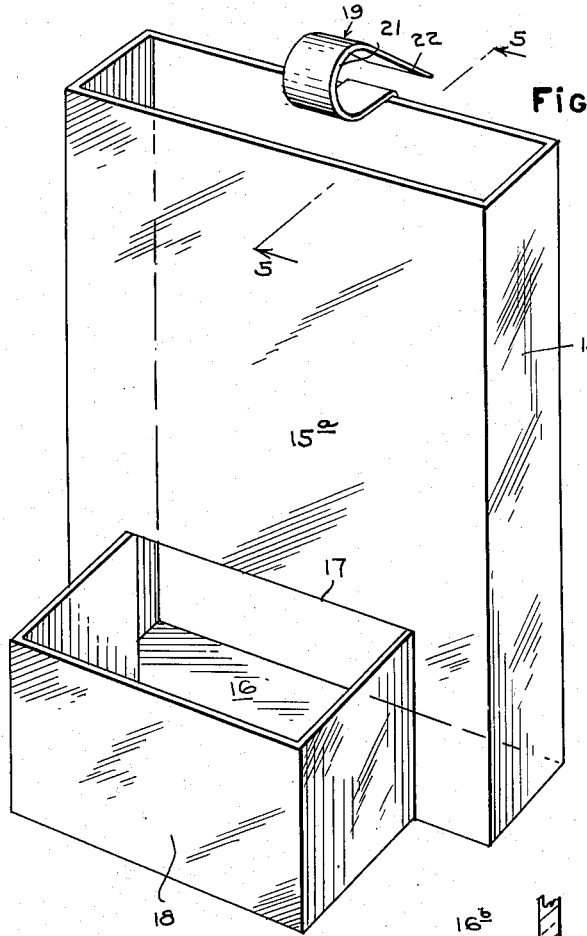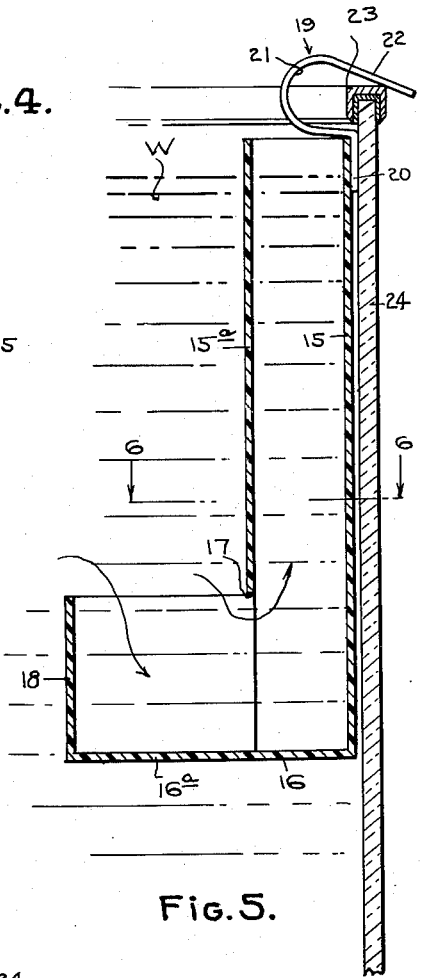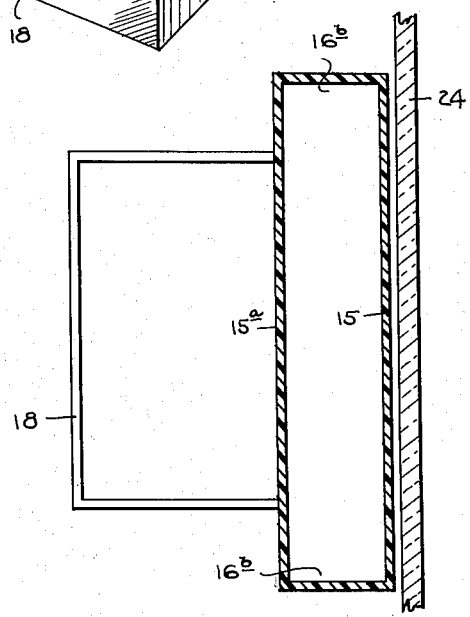

United States Patent Office 2,968,280
Patented Jan. 17, 1961

2,968,280

FISH FEEDING DEVICE FOR AQUARIUMS

Rudy Gutstein, 1035 9th St., Miami Beach, Fla.

Filed Sept. 29, 1959, Ser. No. 843,109

1 Claim. (Cl. 119—5)

This invention relates to a fish feeding station that is adapted to be submerged into the water of an aquarium to be disposed against a side or end wall of the aquarium and to constitute a means whereby conventional fish food may be deposited in the upper end of the device and certain portions of which will settle downwardly to be deposited within a basin that functions to prevent the food from either washing outwardly into the main body of the water by the action of the fish or to prevent the food from drifting beyond the marginal edges of the basin device.

Considerable difficulty has been experienced in the feeding of fish in an aquarium since, certain portions of the food will normally float upon the surface of the water while the heavier particles will fall downwardly to be subsequently embedded within the sand or pebbles in an aquarium where it is difficult for the fish to reach such particles, resulting in dirty or cloudy water that detracts from the appearance of the aquarium and also, the spoiling of unused food which has become embedded into the gravel or sand that may create an unhealthy condition to the aquarium water that requires either frequent changing of the water or in the absence of the water change, the result may be the death of the fish.

Accordingly, the invention is primarily concerned with a feeding station for an aquarium that includes a relatively rigid device that is formed of transparent plastics and that is so supported upon the rim of the aquarium in a manner that the device will lie closely adjacent to the glass or other panel constituting a wall portion of the aquarium and with the device having an upper open end and a closed lower end and whereby food particles may be inserted into the open upper end to be deposited upon the water of the aquarium, and with certain particles of the food falling downwardly to be deposited upon a bottom of the device, where they are subsequently agitated and consumed by the fish without the possibility of the food particles being spilled over into the main body of the aquarium water, where they would normally fall downwardly to be buried in the sand or pebbles normally disposed in the aquarium and with certain portions of the food normally having a tendency to float upon the top of the water within the upper end of the device for a relatively long time, such floating particles to be subsequently engaged and consumed by the fish that swim into and upwardly through the device in order to reach the food that is floating while larger fish swim downwardly into the device to consume relatively large particles of food that may settle downwardly.

The device embodies a novel structure that readily lends itself to forming from clear plastics that offer no blank spots in the aquarium and whereby the fish in the main body of water may observe the food settling downwardly through the device and, the normal tendency of fish to follow food that is settling through the water, will eventually arrive at an opening in the device whereby the food can be reached and absorbed.

The invention also embodies a novel form of suspension hook device that is also formed of plastics and that is connected to the upper end of the feeding device, in a manner whereby the feeding device can be suspended from the upper marginal edge of the aquarium to automatically adjust itself so that a main rear wall of the feeding device will lie substantially flat against the wall of the aquarium.

Novel features of construction and operation of the device will be more clearly apparent during the course of the following description, reference being had to the accompanying drawings wherein has been illustrated a preferred form of the device and wherein like characters of reference are employed to denote like parts throughout the several figures.

In the drawings:

Figure 1 is a perspective view of a device constructed in accordance with the invention, Figure 2 is a vertical section taken on line 2—2 of Figure 1 and illustrating the device in supported relation to the aquarium, Figure 3 is a plan view of the device, Figure 4 is a perspective view of a somewhat modified form of the device, Figure 5 is a vertical section taken substantially on line 5—5 of Figure 4, Figure 6 is a horizontal section taken substantially on line 6—6 of Figure 5, and Figure 7 is a plan view of a further modified form of the device.

Referring specifically to the drawings, the numeral 5 designates a back plate, preferably formed of a sheet of transparent plastics. The plate 5 has molded integrally therewith or cemented thereto, a supporting horizontally arranged shelf 6.

Cemented or otherwise fixedly connected to the shelf 6 and the plate 5 is a semi-cylindrical wall 7. The ends of the wall 7 and its lower marginal edge are cemented to the plate 5 and the shelf 6 or it will be apparent, that the entire structure may be integrally molded.

Molded or otherwise connected to the plate 5 at its upper portion is a semi-cylindrical wall section 8, the end edges of which are either cemented or molded with respect to the plate 5. The wall 8 is concentric to the wall 7 and is also preferably formed of clear plastics.

It will be apparent so far that the wall 8, with the back plate 5 constitutes a semi-cylindrical tube that is open at its upper and lower ends and through which an operator may insert food into the aquarium. The plate 5 and the wall 7 constitute a receptacle or catch basin for food that falls downwardly through the semi-cylindrical tube formed by the wall 8.

Fixedly connected to the upper end of the plate 5, as by cementing, is a suspension hook indicated as a whole by the numeral 9. The hook 9 has a leg portion 10 that is bonded or otherwise united with the rear wall of the plate 5 substantially intermediate its width. The leg portion 10 is bent outwardly to form a generally curved hook 11. The hook 11 terminates in a downwardly inclined tongue portion 12. The tongue portion 12 and the hook 11 are relatively flexible. The suspension device 9 is formed relatively wide so as to prevent any undue rocking motion of the feeding device after it has been suspended within the aquarium.

In the use of the device, the suspension device 9 is engaged with the upper edge of the aquarium wall, usually a channel member 13 that protects the edge of the glass wall forming members 14 of the aquarium. The device upon engagement with the channel member 13, is forced toward the glass 14, causing the suspension device 9 to readily adjust itself due to its flexibility so that the plate 5 of the feeding device will lie substantially parallel to and slightly spaced from the inner face of the glass 14. Should the suspension device 9 be formed integral with the structure, then it is to be assumed that the plate 5 will lie completely flat against the glass. As shown in Figure 2, the structure is submerged into the water (W) of the aquarium to a point where the upper end of the device projects slightly above the surface of the water. Water of course will obviously fill the basin formed by the wall 7 and will also substantially fill the tube formed by the wall 8. Food is then inserted through the upper end of the tube formed by the wall 8, certain particles of which readily sink downwardly to be deposited upon the bottom wall 6 within the confines of the wall 7 and the plate 5. As is well understood, certain particles of food will normally float upon the surface of the water. Smaller fish and possibly some medium size fish, will obviously observe the floating particles and since they can not reach them from the top, they will swim downwardly along the outer side of the wall 8 until they are able to pass beneath the wall at which time they will swim upwardly and absorb the food. The larger fish will obviously feed upon the larger particles and in such case, the larger fish will swim downwardly into the basin formed by the wall 7. It is particularly important, that the fish be unable to agitate the food sufficiently to cause it to float over the upper marginal edge of the wall 7 and the height of this wall has been calculated to successfully trap the food within the basin, regardless of the agitation created by the fish feeding therein. The fish may enter the upper tube or may freely enter the basin without interference and the fish can readily observe the food through the transparency of the device. The device also functions as a means to pour or refill an aquarium without disturbing the plant life, without creating cloudiness to the water and without sufficiently agitating the food as may cause it to float out of the basin formed by the wall 7. When the water has sufficiently evaporated in the aquarium, the operator merely uses a suitable vessel having a spout and pours the water through the upper end of the tube formed by the wall 8. It been found, that the water will flow downwardly and outwardly in a gradual manner to be dispensed throughout the aquarium without disturbing the plant life and without causing the bottom sand and the like from being agitated.

Referring now to Figures 4, 5 and 6, there has been illustrated a slightly modified form of the invention that has substantially the same advantages as the first form of the device.

In this form of the invention there has been provided a generally rectangular transparent shell 15, that is open at its upper end. The shell 15 is closed at its lower end by a bottom 16. The front wall 15a of the shell 15 is cut away adjacent its bottom to form a rectangular opening 17. The bottom 16 has a forward extension 16a that is of a width corresponding to the opening 17. Disposed upon the extension 16a of the bottom, is a box-like structure 18, having a forward wall and end walls, forming a U-frame that is co-extensive with the extension 16a of the bottom 16 and that is completely co-extensive with the opening 17 of the shell 15. The frame created by the box-like structure 18 has a slower marginal portion cemented or otherwise united to the marginal edges of the bottom extension 16a, while the vertical edges of the end walls of the structure 16a are cemented or otherwise bonded to the front wall 15a of the shell 15. Since the box-like structure 18 has a length relatively smaller than the shell 15, it serves to provide, with the bottom 16, pockets 16b, for a purpose to be presently described. The shell 15 and the box 18, together with the bottom 16 is preferably all formed from clear plastics material and either molded integral or fabricated.

As in the first form of the invention, the device is provided with a suspension hook, indicated as a whole by the reference numeral 19. The suspension hook 19 includes a leg portion 20 that is cemented or otherwise bonded to the rear wall of the shell 15 substantially intermediate its width and whereby the suspension hook projects above the shell. The suspension hook is shaped to provide an arcuate socket 21, having a downwardly inclined relatively flexible tongue 22. As illustrated in Figure 5, the suspension device readily adapts itself to any particular suspension area, such as the well recognized channel frame member 23 that is normally connected to the glass panel 24 of an aquarium. It frequently happens that these channel members vary in size and it becomes necessary that a suspension device be so designed as to readily adapt itself to any conventional aquarium in a manner that causes the feeding device to lie closely adjacent to and parallel with the glass panel 24 of the aquarium. The suspension device 19 is likewise formed of a suitable plastics material.

In the use of this form of the invention, the shell 15 and associated parts in the assembly are initially supported upon the channel member 23 of the aquarium, such position causing the feeding device to be submerged to a point closely adjacent the upper end of the shell 15. It is highly desirable that the water in the aquarium be maintained at such a level that it does not permit the complete submerging of the shell, since this would then permit food particles to float outwardly upon the surface of the water and would defeat the purpose of this invention. With the device in suspended relation to the aquarium, the operator feeds the fish by dropping a predetermined quantity of food into the well created by the shell 15, such food falling upon the surface of the water (W). As in the first form of the invention, certain portions of the food will fall downwardly through the water, while other portions will remain in floatation upon the surface of the water. Fish seeing the articles moving downwardly through the water in the well, normally can not reach the food particles, but can clearly see them through the front wall 15a of the shell and the fish then follow the food particles downwardly until they reach a point below the opening 17, at which time the fish swim inwardly to reach the food. The shell 15 is of such dimensions that fish may also swim upwardly inside of the well to reach other particles of food that are gradually falling downwardly and subsequently swim downwardly and out of the top opening of the box structure 18. Such food particles as are not absorbed by the fish during their movement downwardly through the water, will fall and rest upon the bottom 16. Fish may reach these food particles at all times by swimming through the opening of the box structure 18 and in such swimming action, the fish normally create a disturbance in the water and the area of the food, causing it to be agitated partially floating upwardly. However, the box structure is of such height that the normal movement of the fish in reaching the food fails to create sufficient turbulence in the water as might possibly cause the food to float outwardly through the opening of the box structure 18 to fall downwardly to the bottom of the aquarium. Food particles that are normally agitated by the fish, promptly settle downwardly to again rest upon the bottom. When the device is to be cleaned, the shell 15 is disengaged from the aquarium and such water as remains in the shell may be gradually poured back into the aquarium without dislodging any of the food particles and such food particles as remain in the feeding device will shift toward one of the pockets 16b and be trapped therein against movement outward into the main body of the water. Also, water may be added to the aquarium by pouring through the shell 15, where it will flow in an even manner from the opening 17 and the opening of the box structure 18 to gradually merge with the water in the aquarium without creating turbulence.

The modified form of the device illustrated in Figure 7 is substantially identical to that illustrated in Figures 1-3 inclusive with the exception, that the device embodies a back wall 5a, having a shelf 6a. The basin forming wall is now shown as constituting a rectangular receptacle 7a, while the upper tubular member 8a is also formed rectangular and parallel with the basin 7a. The same suspension device 9 will be employed in connection with this form of the device. In all other respects, this form of the invention functions identical to that disclosed with respect to the first form of the device.

It will be apparent from the foregoing that there has been presented herewith two forms of fish feeding devices that function to effectively provide a feeding station, without any of the food passing into the main body of the water in the aquarium where it would normally be deposited in the sand or gravel of the aquarium to subsequently contaminate the water. These feeding devices are novel in that food entering the upper frame wall sections is held in suspension in the water for a substantial time before settling into the lower box frame wall sections, permitting the fish to follow particles of food downwardly and to subsequently reach the food through the openings between the sections in the feeding stations. The structures are such that fish swimming therein to obtain the food do not eject the food from the device into the main body of the water. The structure is simple, is strong, durable, ornamental in appearance, is highly transparent and is most successful as a feeding station of the type that prevents waste of food and contamination of the aquarium waters. Further, the devices embody a novel form of suspension means whereby the devices may be clipped to any aquarium of average construction and readily adjusts itself to the point where the feeding device either lies against or closely adjacent to the glass wall of the aquarium.

It is to be understood that the invention is not limited to the precise construction shown, but that changes are contemplated as readily fall within the spirit of the invention as shall be determined by the scope of the subjoined claim.

Having described my invention, what I claim as new and desire to secure by Letters Patent is:

A fish feeding station for aquariums that is adapted to be submerged in water in the aquarium to a point where an upper end of the station projects slightly above the water, the stations embodying a back plate having a forwardly extending horizontal shelf at its lower end, a frame supported upon the shelf and having its lower edges and its ends united with the shelf and the back plate, the frame being upwardly opening and constituting a receptacle, a second frame arranged above the first frame in spaced apart relation and having its marginal ends united with the back plate, the second frame being relatively smaller than the first frame and with the second frame being open at top and bottom and defining a vertical tube into which fish food is inserted to enter the water of the aquarium, certain particles of food sinking downwardly through the water to be disposed in the receptacle, the spacing of the frame being such that fish may freely enter the receptacle to feed or to enter the open lower end of the tube to reach particles of food that may float upon the water adjacent the upper end of the tube, a self adjusting suspension device carried by the back plate at its upper end, the entire station being formed of transparent plastics, the upper and lower frames being semi-cylindrical in top plan and with the frames being concentric, the suspension hook being in the form of an open rearwardly facing socket and with the socket terminating in a rearwardly and downwardly angled tongue and with the socket and the tongue being formed of transparent plastics and flexible whereby to override and conform to the marginal edge of the aquarium whereby to maintain the back plate substantially parallel to the adjacent wall of the aquarium throughout its height.

References Cited in the file of this patent

UNITED STATES PATENTS

| | | |
|---|---|---|
| 638,998 | Stueve | Dec. 12, 1899 |
| 1,240,864 | McCollough | Sept. 25, 1917 |
| 2,718,211 | Pettas | Sept. 20, 1955 |
| 2,727,489 | Sklar | Dec. 20, 1955 |
| 2,754,800 | Gare | July 17, 1956 |
| 2,839,028 | Routh | June 17, 1958 |